E. J. NELSON & F. H. LANG.
WHEEL.
APPLICATION FILED APR. 13, 1911.
1,010,786.
Patented Dec. 5, 1911.
2 SHEETS—SHEET 1.
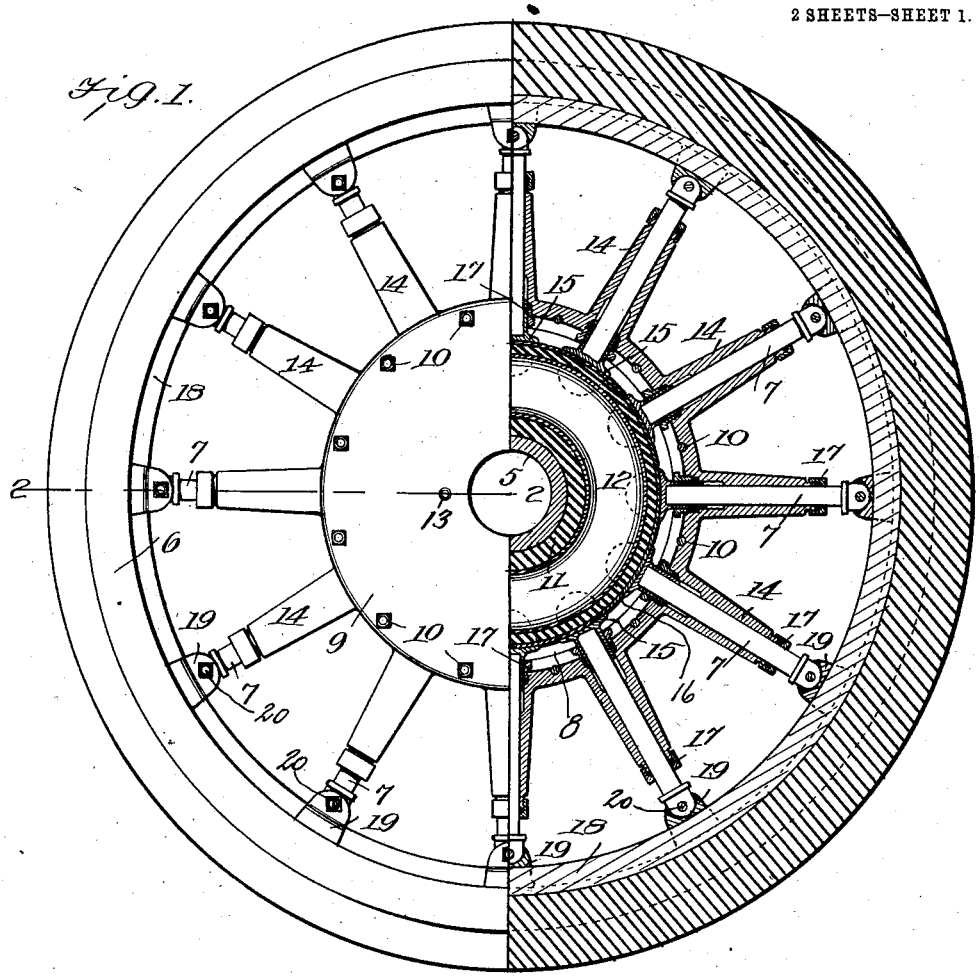
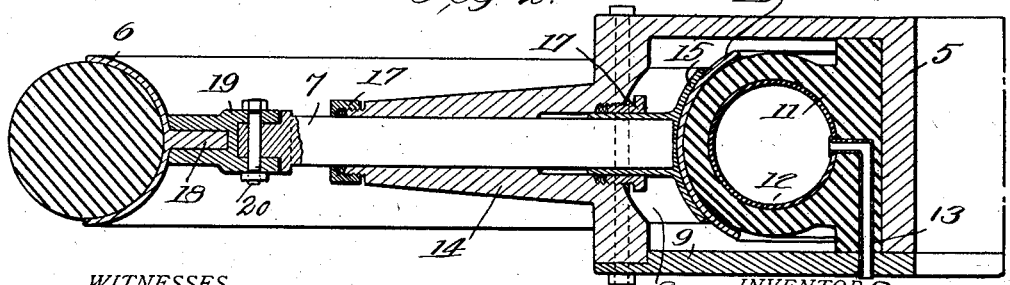
WITNESSES
INVENTORS
Edward J. Nelson
Frank H. Lang
BY
Attorneys

E. J. NELSON & F. H. LANG.
WHEEL.
APPLICATION FILED APR. 13, 1911.

1,010,786.

Patented Dec. 5, 1911.
2 SHEETS—SHEET 2.

Inventors
Edward J. Nelson
Frank H. Lang

Witnesses

By

Attorneys

UNITED STATES PATENT OFFICE.

EDWARD J. NELSON, OF ALLIANCE, AND FRANK H. LANG, OF HAVELOCK, NEBRASKA, ASSIGNORS OF FIFTY-TWO ONE-HUNDREDTHS TO VACLAV F. HOFMANN, OF HAVELOCK, NEBRASKA.

WHEEL.

1,010,786.      Specification of Letters Patent.      Patented Dec. 5, 1911.

Application filed April 13, 1911. Serial No. 620,941.

*To all whom it may concern:*

Be it known that we, EDWARD J. NELSON and FRANK H. LANG, citizens of the United States, residing at Alliance and Havelock, respectively, in the counties of Box Butte and Lancaster and State of Nebraska, have invented certain new and useful Improvements in Wheels, of which the following is a specification.

This invention relates to that class of wheels in which a pneumatic cushioning element, such as an inflatable tube, is located within the wheel hub, and which element takes the place of the ordinary pneumatic tire, the latter being thus dispensed with.

It is the object of the present invention to provide a simple, strong and practical wheel of this kind which is so constructed that the hub always seeks its proper level under any load, and an equal pressure is obtained on all parts; and, furthermore, to provide a device for preventing wear of the air tube.

The invention also has for its object to provide a novel construction and arrangement of parts to be hereinafter described and claimed.

Figure 3:
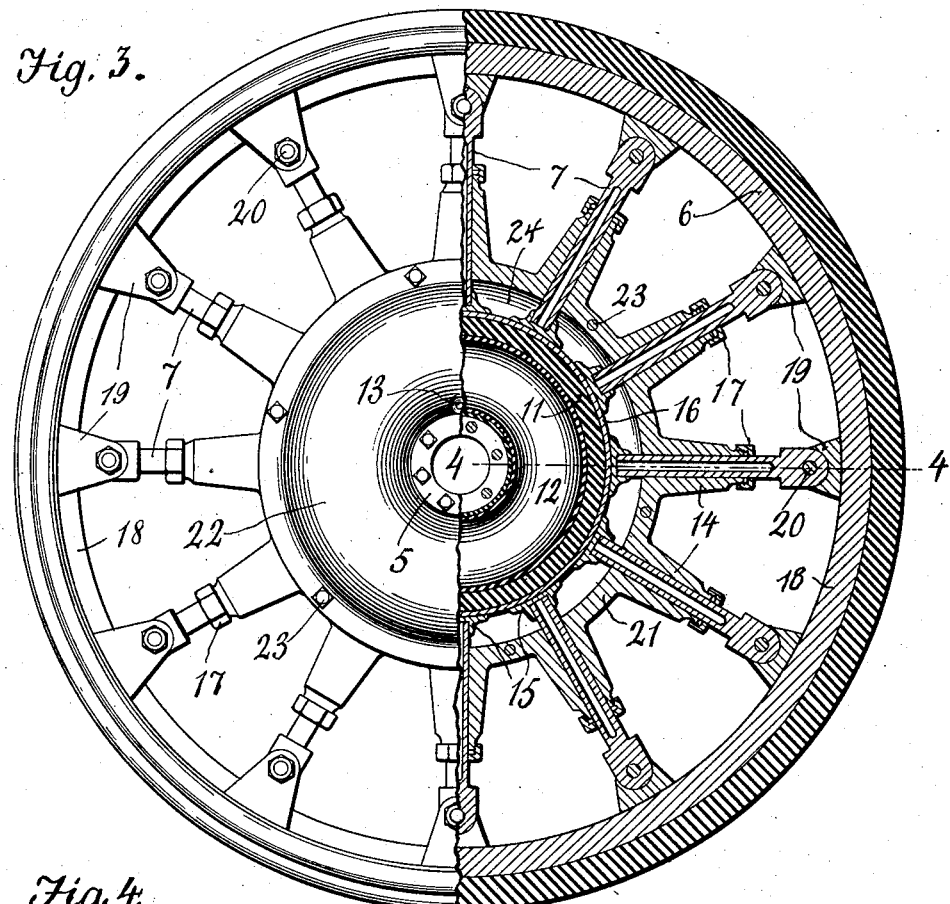
Figure 4:
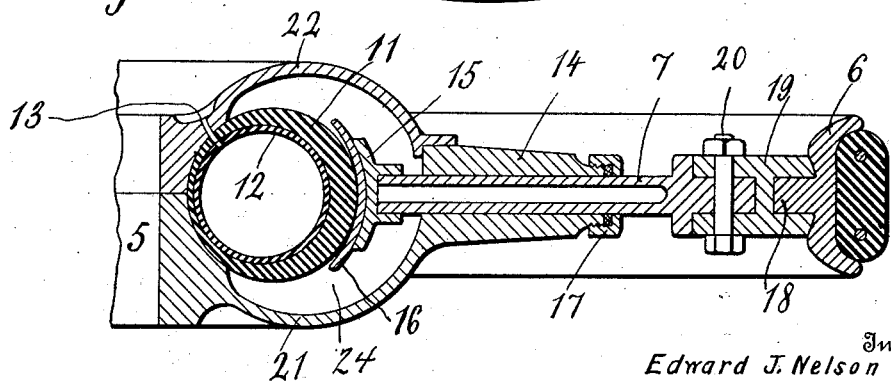

In the accompanying drawing forming a part of this specification—Figure 1 is an elevation, partly in section, of a wheel constructed in accordance with the present invention. Fig. 2 is an enlarged horizontal section on the line 2—2 of Fig. 1. Fig. 3 is an elevation, partly in section, of a slightly modified form of wheel. Fig. 4 is an enlarged horizontal section on the line 4—4 of Fig. 3.

Referring specifically to the drawing, 5 denotes the hub of the wheel; 6, the rim, and 7 the spokes. The hub is formed with an annular channel 8 which is concentric to the hub bore and opens through one side of the hub, to which side is fastened a cover plate 9 which closes up the channel. The cover plate is secured to the hub by bolts 10 passing therethrough.

In the channel 8 is mounted an inflatable rubber tube 11 similar to an ordinary pneumatic tire, but of much smaller diameter, said tube having a broad, flat base which seats on the inner circular wall of the channel, and is fastened thereto in any suitable manner to prevent creeping. The tube 11 contains an inner tube 12. A suitable inflating valve 13 is provided.

The hub is formed with radially extending tubular arms 14 which are spaced uniformly apart and have their outer ends spaced a sufficient distance from the rim 6 so as not to come in contact therewith. In these arms are mounted the spokes 7, said spokes working with a sliding fit in the bores of the arms, and extending at their inner ends into the channel 8. The inner ends of the arms carry shoes 15 which bear against a ring 16 encircling the tube 11. The ring is formed of steel, and prevents the shoes 15 from coming in direct contact with the tube 11, thus preventing wear of the latter. The ring is concavo-convex in cross section, its concave portion being in engagement with the tube, by reason of which the ring is made to partly inclose the tube, and to have a solid bearing thereagainst. The shoe is also concavo-convex in cross section and curved in the direction of its length to fit the outer periphery of the ring 16.

The inner and outer ends of the bores of the arms 14 are formed with stuffing boxes which are closed by packing nuts 17. This construction permits ample lubrication of the spokes 7, and prevents leakage of the lubricant.

On the inner periphery of the rim 6 is a continuous outstanding flange 18 on which are mounted clips 19 to which the spokes 7 are pivotally connected at their outer ends, said clips being spaced uniformly apart on the flange and so positioned that the spokes extend accurately on radial lines between the hub and the rim. The clips are shaped at their outer ends to straddle the flange 18, and to their inner ends the spokes are pivotally connected by means of a bolt 20 passing therethrough.

The advantage of the herein described structure is that the wheel may be manufactured at only a slightly advanced price over an ordinary wooden wheel, and it is stronger, and when fully equipped will not exceed the weight of a wooden wheel. The same ease and cushion effect is obtained as with a pneumatic tire, thus enabling the latter to be dispensed with, and thereby saving the expense of tire repairs, and the dangers and inconvenience of bursting tires and punctures.

All the parts are solid and compact, and the wheel is adapted to any kind of use, light driving or heavy trucking, and with any kind of motor power.

The clips 19 are securely held on the flange 18 and prevent their creeping thereon when the tube 11 is inflated. In case of wear, the tube may be deflated, whereupon the clips may be shifted around on the flange to a new position. The pivotal connection between the clips and the outer ends of the spokes allows the hub to seek its proper level under any load, and an equal pressure is obtained on all the parts.

In the modified form of wheel shown in Figs. 3 and 4, the spokes 7 are tubular and the stuffing boxes and packing nuts 17 at the inner ends thereof are dispensed with. The hub is made in two parts indicated at 21 and 22, respectively, said parts being secured in face-to-face relation by bolts 23. The arms 14 are formed integral with the part 21. The two parts 21 and 22 are shaped to form an annular channel 24 to receive the inflatable tube 11.

We claim:

A wheel comprising a hub, an inflatable tube carried by the hub, a rim having a continuous outstanding flange on its inner periphery, clips straddling said flange and adjustable thereon, spokes pivotally connected to the clips and having a sliding engagement with the hub, and shoes carried by the inner ends of the spokes, said shoes being in engagement with the aforesaid tube.

In testimony whereof we affix our signatures in presence of two witnesses.

EDWARD J. NELSON.
FRANK H. LANG.

Witnesses:
MARGARET L. ADAMS,
JOHN M. MALONE.

---

Copies of this patent may be obtained for five cents each, by addressing the "Commissioner of Patents, Washington, D. C."